US012781474B2

(12) United States Patent
Arai et al.

(10) Patent No.: US 12,781,474 B2
(45) Date of Patent: Nov. 3, 2026

(54) WORK MACHINE

(71) Applicant: Hitachi Construction Machinery Co., Ltd., Tokyo (JP)

(72) Inventors: Daijirou Arai, Tsuchiura (JP); Kazuo Takiguchi, Tsuchiura (JP); Kyousuke Akiyama, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 19/155,294

(22) PCT Filed: Dec. 27, 2023

(86) PCT No.: PCT/JP2023/047037

§ 371 (c)(1),
(2) Date: Aug. 11, 2025

(87) PCT Pub. No.: WO2024/202356

PCT Pub. Date: Oct. 3, 2024

(65) Prior Publication Data

US 2026/0234907 A1 Aug. 13, 2026

(30) Foreign Application Priority Data

Mar. 28, 2023 (JP) ................................ 2023-051318

(51) Int. Cl.

| | |
|---|---|
| ***E02F 9/22*** | (2006.01) |
| ***E02F 9/20*** | (2006.01) |
| ***F15B 11/17*** | (2006.01) |

(52) U.S. Cl.

CPC .......... *E02F 9/2203* (2013.01); *E02F 9/2004* (2013.01); *E02F 9/2267* (2013.01);

(Continued)

(58) Field of Classification Search

CPC ........ F15B 11/02; F15B 11/17; F15B 21/087; F15B 2211/20546; F15B 2211/20576; F15B 2211/405; E02F 9/2292

See application file for complete search history.

(56) References Cited

U.S. PATENT DOCUMENTS

| | | | |
|---|---|---|---|
| 5,829,252 | A | 11/1998 | Hirata et al. |
| 6,672,055 | B1 | 1/2004 | Konishi et al. |

(Continued)

FOREIGN PATENT DOCUMENTS

| | | | |
|---|---|---|---|
| JP | 9-79212 | A | 3/1997 |
| JP | 2001-140806 | A | 5/2001 |

(Continued)

OTHER PUBLICATIONS

International Preliminary Report on Patentability (PCT/IB/338 & PCT/IB/373) issued in PCT Application No. PCT/JP2023/047037 dated Oct. 9, 2025, including English translation of Written Opinion (PCT/ISA/237) (5 pages).

(Continued)

*Primary Examiner* — Thomas E Lazo

(74) *Attorney, Agent, or Firm* — Crowell & Moring LLP

(57) ABSTRACT

A work machine is provided with a first hydraulic actuator that uses a plurality of hydraulic pumps as hydraulic fluid sources; a plurality of pump combiner valves that controls each supply flow rate of hydraulic fluid from the plurality of hydraulic pumps to the first hydraulic actuator; a second hydraulic actuator that shares a hydraulic fluid source with the first hydraulic actuator; and a controller that controls the plurality of pump combiner valves, and the controller stores priority pump data defining a priority pump corresponding to the first hydraulic actuator for each operation load pattern, specifies the priority pump on the basis of the priority pump data according to the operation load pattern at the time when the first operation device is operated to control the plurality (Continued)

of pump combiner valves, and learns and updates the priority pump data from operation signals of the first and second operation devices and the load pressure of the first hydraulic actuator. Accordingly, it is possible to decide an appropriate priority pump every time for each hydraulic actuator in various situations without depending on the judgment by an operator.

6 Claims, 9 Drawing Sheets

(52) U.S. Cl.
CPC .......... *E02F 9/2271* (2013.01); *E02F 9/2292* (2013.01); *F15B 11/17* (2013.01); *E02F 9/2285* (2013.01); *E02F 9/2296* (2013.01)

(56) References Cited

U.S. PATENT DOCUMENTS 8,910,474 B2 * 12/2014 Knussman .............. F15B 7/003 60/421
2013/0098019 A1 * 4/2013 Opdenbosch ........... F15B 7/008 60/428
2013/0152565 A1 * 6/2013 Ma ........................ E02F 9/2296 60/327
2018/0058041 A1 * 3/2018 Kamoshita ............ E02F 9/2292
2018/0119389 A1 5/2018 Hewitt
2023/0119892 A1 * 4/2023 Nakajima ............. E02F 9/2203

FOREIGN PATENT DOCUMENTS

JP 2017-53383 A 3/2017
JP 2021-110406 A 8/2021
KR 10-2018-0037127 A 4/2018

OTHER PUBLICATIONS

International Search Report (PCT/ISA/210) issued in PCT Application No. PCT/JP2023/047037 dated Feb. 20, 2024, with English translation (5 pages).
Japanese-language Written Opinion (PCT/ISA/237) issued in PCT Application No. PCT/JP2023/047037 dated Feb. 20, 2024, with English translation (6 pages).

* cited by examiner

[FIG. 1]
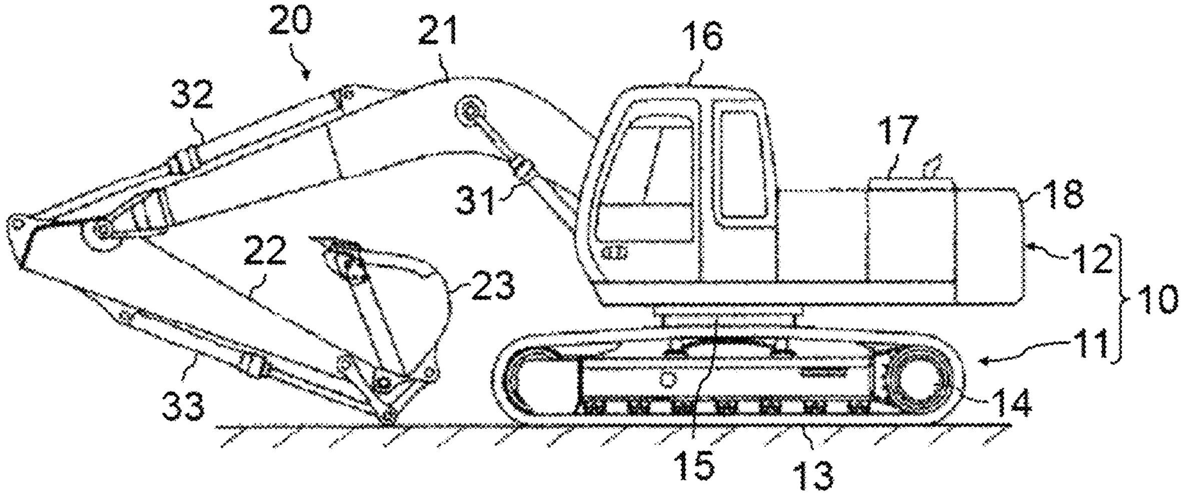

[FIG. 2]
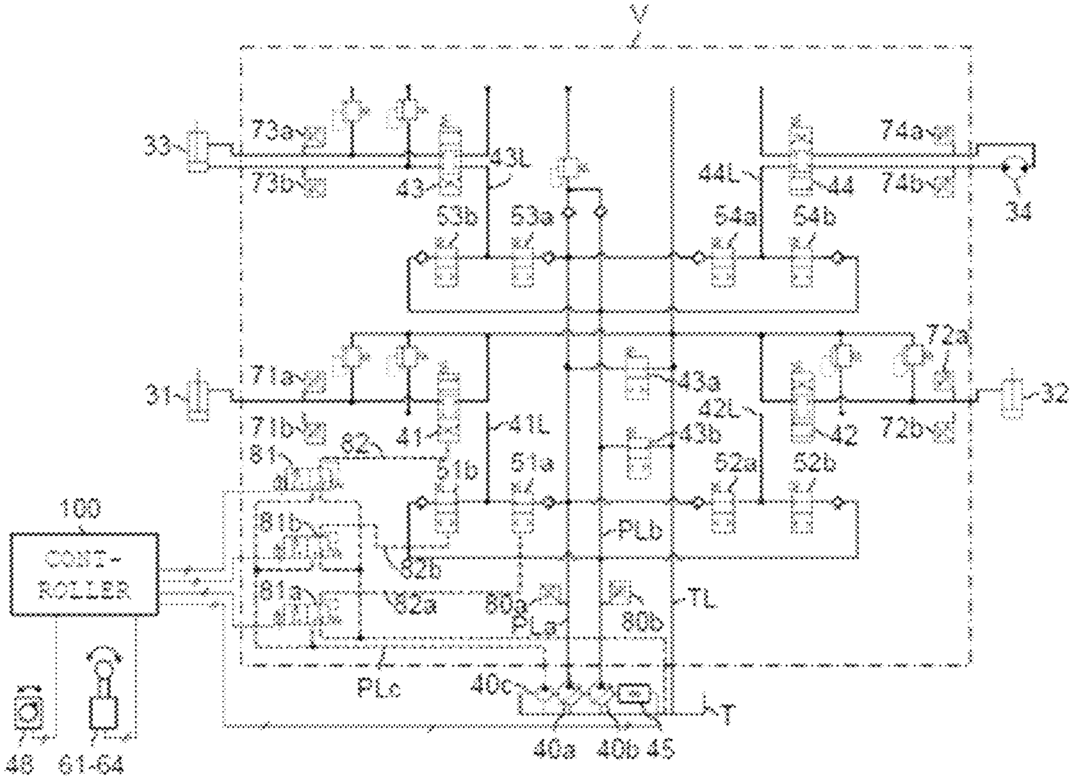

[FIG. 3]
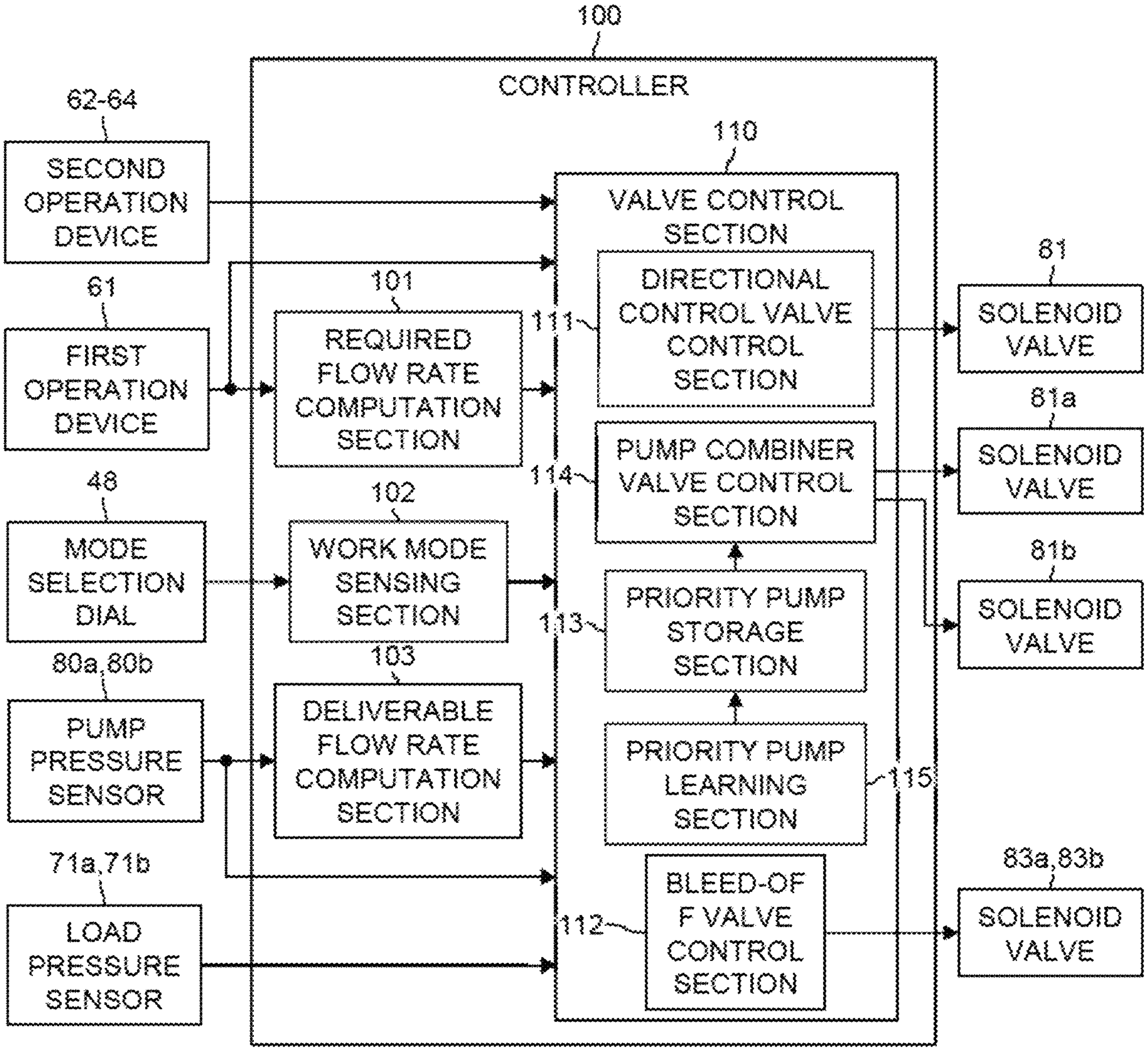

[FIG. 4]
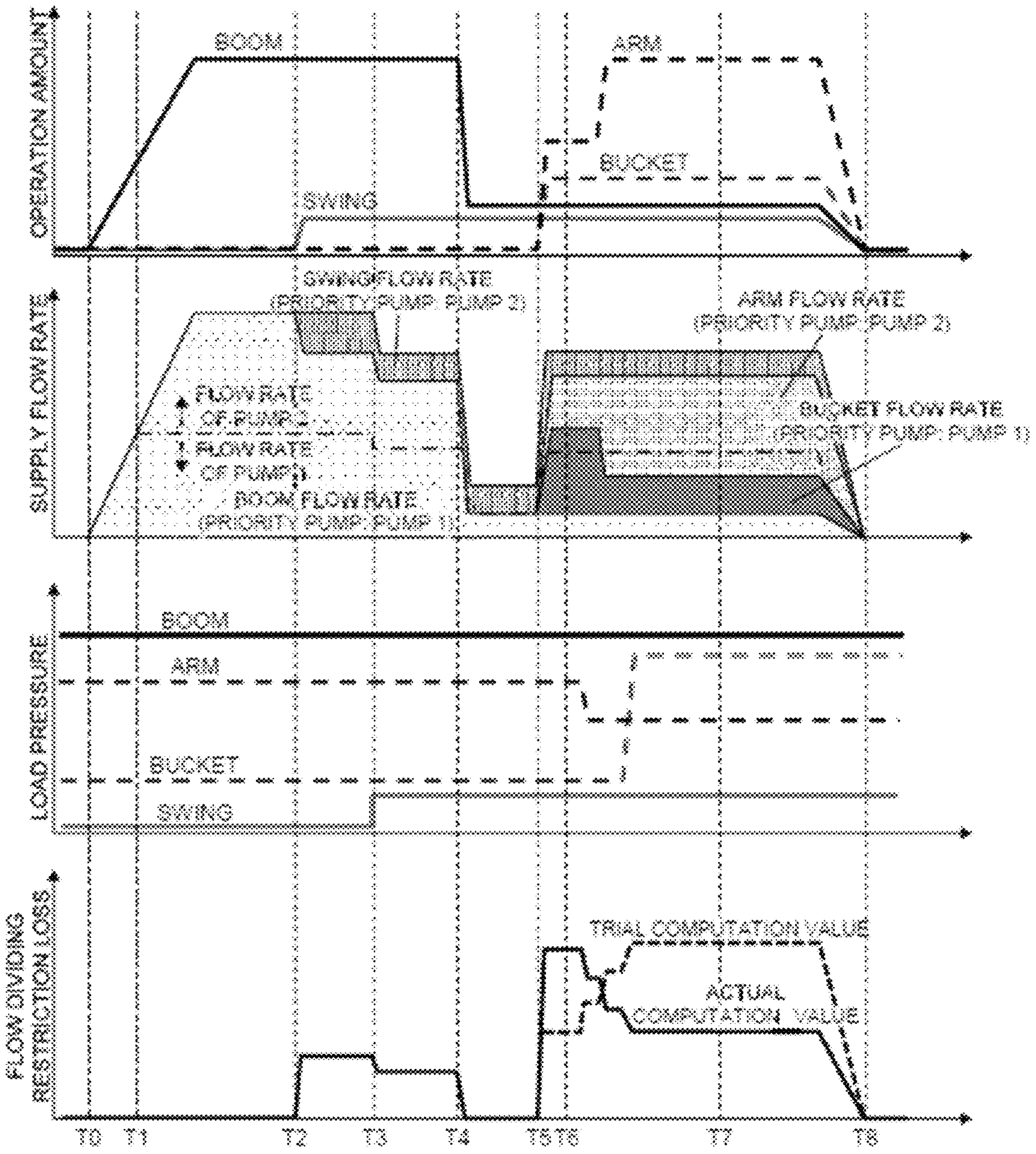

[FIG. 5]
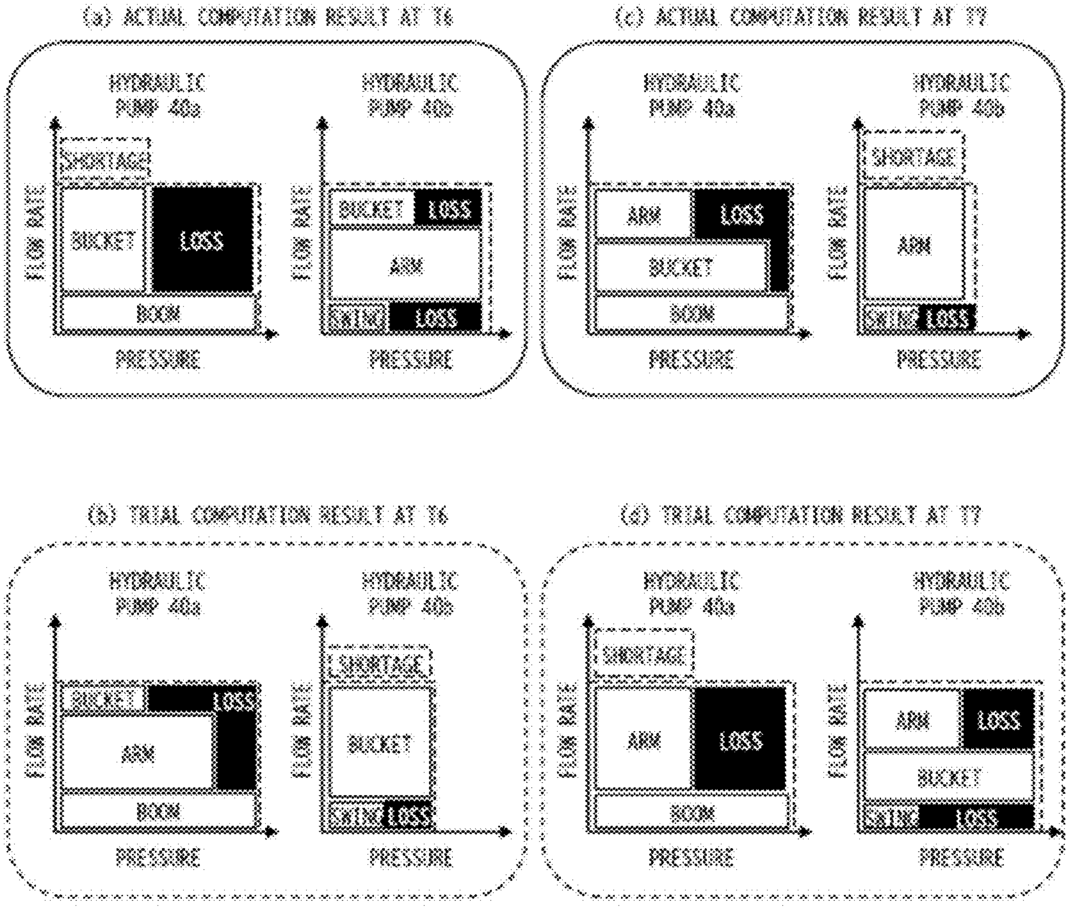

[FIG. 6]

| TARGET ACTUATOR: ARM / WORK MODE: WORK AMOUNT PRIORITY | | | | | | | |
|---|---|---|---|---|---|---|---|
| OPERATION PATTERN | OPERATION ORDER | 1 | ... | 3 | 3 | 3 | ... |
| | REQUIRED FLOW RATE | LARGE | ... | SMALL | MIDDLE | MIDDLE | ... |
| | PRECEDING OPERATION ACTUATOR | - | ... | BOOM BUCKE T | BOOM SWING | BOOM SWING | ... |
| LOAD PATTERN | LOAD PRESSURE | HIGH | ... | HIGH | HIGH | MIDDLE | ... |
| | PUMP PRESSURE 1 | LOW | ... | HIGH | HIGH | HIGH | ... |
| | PUMP PRESSURE 2 | HIGH | ... | LOW | LOW | HIGH | ... |
| PRIORITY PUMP | | PUMP 2 | ... | PUMP 1 | PUMP 2 | PUMP 1 | ... |

[FIG. 7]
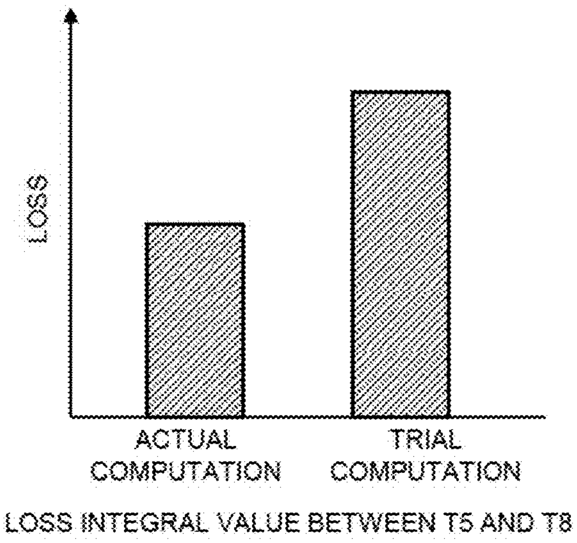

[FIG. 8]
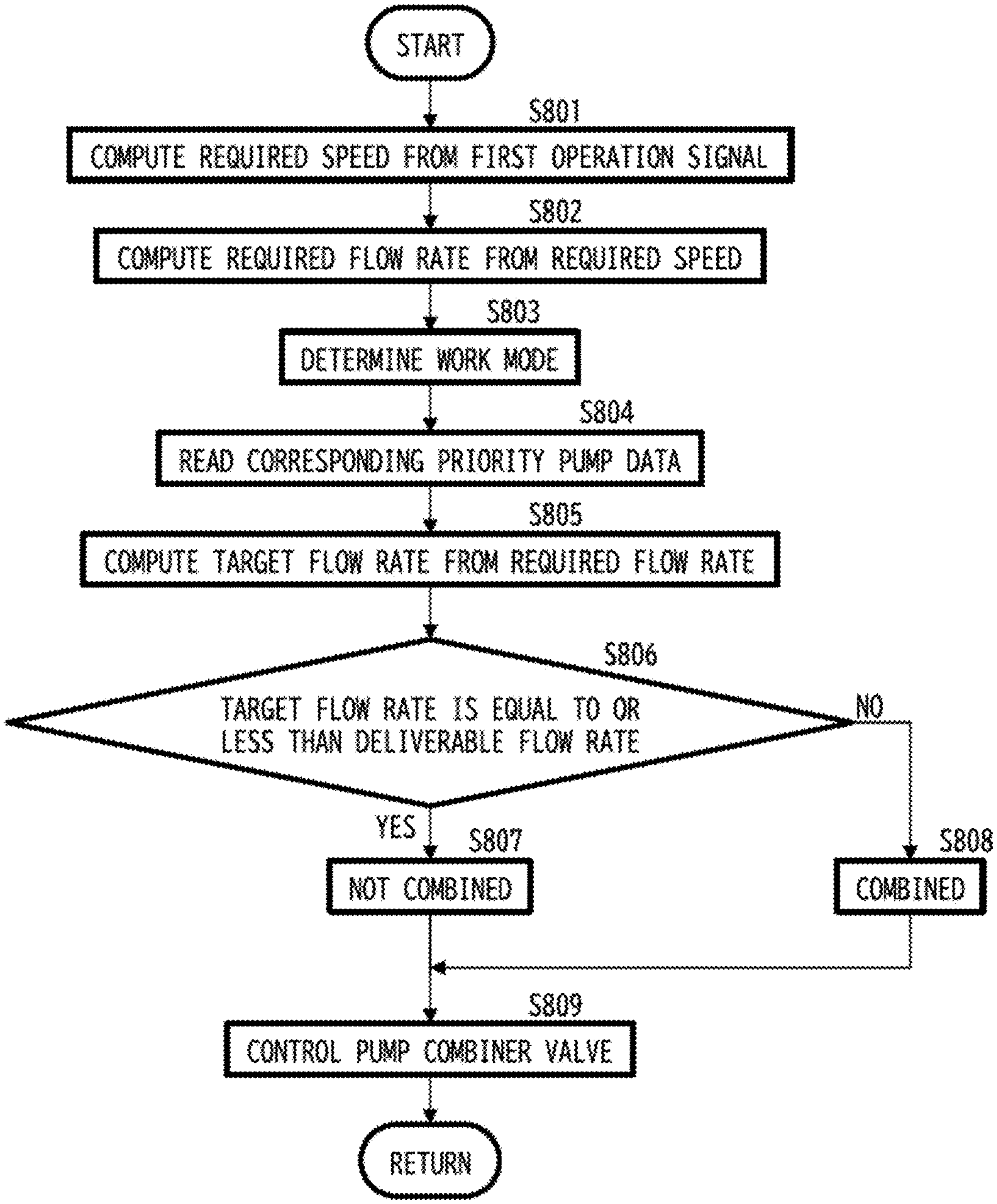

[FIG. 9]
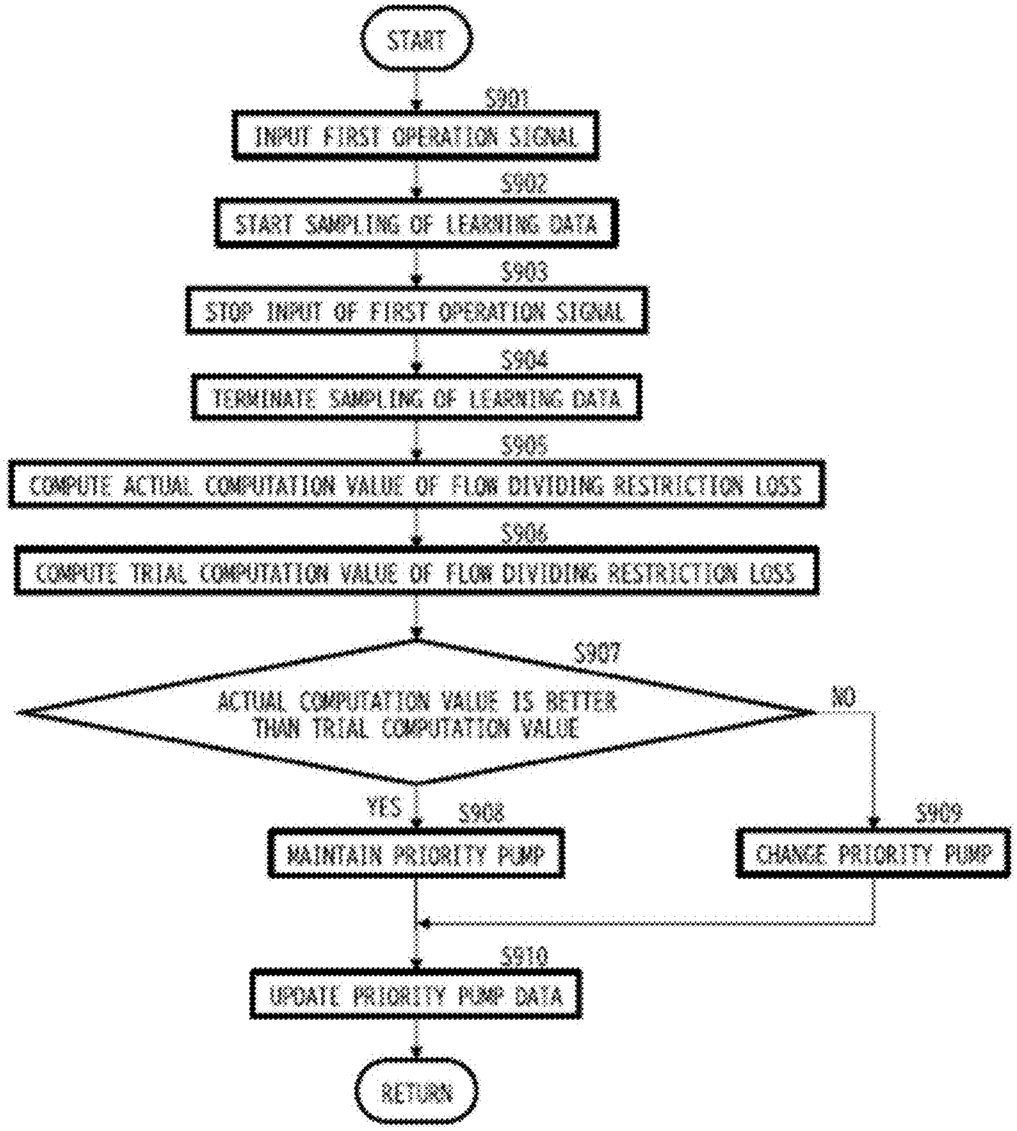

WORK MACHINE

TECHNICAL FIELD

The present invention relates to a work machine such as a hydraulic excavator.

BACKGROUND ART

Some work machines such as hydraulic excavators are configured such that a plurality of hydraulic pumps is mounted and hydraulic fluid can be supplied from the plurality of hydraulic pumps to the same hydraulic actuator. In the work machine of this type, hydraulic fluid is supplied to each hydraulic actuator from a hydraulic pump (hereinafter, a priority pump) whose priority is set to the highest in advance, and in a case where a supply flow rate is insufficient for a target flow rate, the shortage to the target flow rate is compensated by delivery oil of another hydraulic pump. The priority pump is usually set for each hydraulic actuator in consideration of the frequency of operations, the frequency of use for combined operations with another hydraulic actuator, the work load, and the like. In a case where opening characteristics of a control valve and hardware such as a hydraulic circuit are adjusted according to the setting of the priority pump for each hydraulic actuator, the correspondence relationship between the hydraulic actuator and the priority pump cannot be easily changed.

On the other hand, there has been known a work machine in which a plurality of modes in which the correspondence relationships between a hydraulic actuator and a priority pump differ from each other are prepared in advance so as to be changed by optionally being selected (see Patent Document 1).

PRIOR ART DOCUMENT

Patent Document

Patent Document 1: JP-2021-110406-A

SUMMARY OF THE INVENTION

Problem to be Solved by the Invention

However, in the technique described in Patent Document 1, since the priority pump is changed by an operator selecting an optional mode among the plurality of modes prepared in advance, the following problems arise.

First, the work of the work machine is diverse, and the load pressure condition of the hydraulic actuator largely differs depending on a work site and a situation even in a case where the same operation is performed. Thus, an appropriate priority pump for each hydraulic actuator may differ even between cases in which similar operations are assumed. Therefore, the operator must judge and select an appropriate mode such that the relationship between each hydraulic actuator and the priority pump is appropriate for each work, which places a large burden on the operator.

In addition, as the number of hydraulic actuators using a plurality of hydraulic pumps as hydraulic fluid supply sources increases, the setting of an appropriate priority pump for each hydraulic actuator becomes complicated, and judgement itself of a mode becomes difficult.

An object of the present invention is to provide a work machine capable of deciding an appropriate priority pump every time for each hydraulic actuator in various situations without depending on the judgment by an operator.

Means for Solving the Problem

In order to achieve the above object, the present invention provides a work machine including: a plurality of hydraulic pumps; a first hydraulic actuator that uses the plurality of hydraulic pumps as hydraulic fluid sources; a directional control valve that controls a flow of hydraulic fluid to the first hydraulic actuator; a plurality of pump combiner valves that controls each supply flow rate of hydraulic fluid from the plurality of hydraulic pumps to the first hydraulic actuator; a first operation device that operates the directional control valve; a load pressure sensor that senses a load pressure of the first hydraulic actuator; a second hydraulic actuator that can share a hydraulic fluid source with the first hydraulic actuator; a second operation device that operates the second hydraulic actuator; and a controller that controls the plurality of pump combiner valves, in which the controller stores priority pump data defining a priority pump that is selected from among the plurality of hydraulic pumps according to an operation of the first operation device and preferentially supplies hydraulic fluid to the first hydraulic actuator for each operation load pattern classified according to operation patterns of the first hydraulic actuator and the second hydraulic actuator and a load pattern of a hydraulic circuit of the first hydraulic actuator, and has a first function related to operation control of the plurality of pump combiner valves and a second function related to learning of the priority pump data.

Further, by the first function, the controller controls the plurality of pump combiner valves when the first operation device is operated, on the basis of the operation patterns corresponding to a first operation signal input in response to the operation of the first operation device and a second operation signal input in response to operation of the second operation device, the load pattern corresponding to the load pressure input from the load pressure sensor, and the priority pump data. Furthermore, by the second function, the controller accumulates actual result data on the first operation signal, the second operation signal, and the load pressure by the second function, is configured to compute an actual computation value of a preset predetermined optimization index for the operation of the first operation device on the basis of the actual result data under an implementation condition in which hydraulic fluid is preferentially supplied to the first hydraulic actuator from the priority pump, is configured to compute a trial computation value of the optimization index for the operation of the first operation device on the basis of the actual result data under a virtual condition in which hydraulic fluid is preferentially supplied to the first hydraulic actuator from a non-priority pump that is one of the hydraulic pumps excluding the priority pump, and is configured to compare the actual computation value and the trial computation value with each other, and update the priority pump data by reflecting the virtual condition in a case where the trial computation value is better than the actual computation value.

Advantages of the Invention

According to the present invention, it is possible to decide an appropriate priority pump every time for each hydraulic actuator in various situations without depending on the judgment by an operator.

BRIEF DESCRIPTION OF THE DRAWINGS

FIG. 1 is a side view of a hydraulic excavator as an example of a work machine according to an embodiment of the present invention.

FIG. 2 is a diagram for depicting an essential part of a hydraulic circuit diagram of a hydraulic system mounted on the hydraulic excavator of FIG. 1.

FIG. 3 is a diagram for depicting an essential part of a functional block diagram of a controller mounted on the hydraulic excavator of FIG. 1.

FIG. 4 is a diagram for depicting changes in an operation amount, a supply flow rate, a load pressure, and a flow dividing restriction loss in an example of an operation of the hydraulic excavator of FIG. 1.

FIG. 5 are diagrams for depicting computation results of the flow dividing restriction loss related to each hydraulic pump at times T6 and T7 of FIG. 4.

FIG. 6 is a diagram for depicting an example of priority pump data.

FIG. 7 is a diagram for depicting the actual computation value and the trial computation value of the integral value of the flow dividing restriction loss in a period from time T5 to time T8 of FIG. 4.

FIG. 8 is a flowchart for depicting an operation control procedure of pump combiner valves by the controller mounted on the hydraulic excavator of FIG. 1.

FIG. 9 is a flowchart for depicting a learning procedure of the priority pump data by the controller mounted on the hydraulic excavator of FIG. 1.

MODES FOR CARRYING OUT THE INVENTION

An embodiment of the present invention will be described below by using the drawings.

1. Work Machine

FIG. 1 is a side view of a hydraulic excavator as an example of a work machine according to an embodiment of the present invention. In the present embodiment, a hydraulic excavator in which a bucket 23 is mounted to the tip end of a work device 20 (front work implement) as an attachment will be described as an example of the work machine. However, the present invention can also be applied to a hydraulic excavator equipped with an attachment other than the bucket, or other kinds of work machines such as a wheel loader and a bulldozer. In the specification, the front (the left side in FIG. 1) of an operation room 16 is defined as the front of the hydraulic excavator (strictly, a swing structure 12).

The hydraulic excavator depicted in the drawing is provided with a machine body 10 and the work device 20. The machine body 10 is provided with a track structure 11 and the swing structure 12.

In the present embodiment, the track structure 11 is provided with crawler-type left and right travel devices 13 having endless track crawler belts, and the left and right travel devices 13 are driven to travel by left and right travel motors 14, respectively. Hydraulic motors are used for the travel motors 14.

The swing structure 12 is swingably provided above the track structure 11 via a swing device 15. The swing device 15 coupling the track structure 11 and the swing structure 12 to each other includes a swing motor 34 (FIG. 2), and the swing structure 12 is driven by the swing motor 34 and swings about the central axis perpendicular to the track structure 11. A hydraulic motor is used for the swing motor 34. The operation room 16 on which an operator rides is provided in a front part (the front left side in the present embodiment) of the swing structure 12. A machine chamber 17 for accommodating hydraulic pumps 40*a* and 40*b* (FIG. 2) and the like is mounted on the rear side of the operation room 16 in the swing structure 12, and a counterweight 18 for balancing the weight with the work device 20 is mounted at the rear end thereof.

The work device 20 is an articulated work arm for performing work such as excavation of earth and sand, and is coupled to a front part (the right side of the operation room 16 in the present embodiment) of the swing structure 12. The work device 20 includes a boom 21, an arm 22, and a bucket 23. The boom 21 is coupled by pins to a base frame, which is called a swing frame, of the swing structure 12, and rotates up and down with respect to the swing structure 12 in conjunction with extension and contraction of a boom cylinder 31. Both ends of the boom cylinder 31 are rotatably coupled to the boom 21 and the swing structure 12. The arm 22 is coupled to the tip end of the boom 21 by pins, and rotates back and forth with respect to the boom 21 in conjunction with extension and contraction of an arm cylinder 32. Both ends of the arm cylinder 32 are rotatably coupled to the arm 22 and the boom 21. The bucket 23 is coupled to the tip end of the arm 22 by pins and rotates with respect to the arm 22 in conjunction with extension and contraction of the bucket cylinder 33. The base end of the bucket cylinder 33 is coupled to the arm 22 and the tip end thereof is coupled to the bucket 23 via a link. The boom cylinder 31, the arm cylinder 32, and the bucket cylinder 33 that drive the work device 20 are hydraulic actuators. The bucket 23 is an attachment and can be replaced with another attachment such as a grapple or a crusher.

2. Hydraulic System

FIG. 2 depicts an essential part of a hydraulic circuit diagram of a hydraulic system mounted on the hydraulic excavator of FIG. 1. In FIG. 2, circuits for driving the boom cylinder 31, the arm cylinder 32, the bucket cylinder 33, and the swing motor 34 are extracted and depicted.

The hydraulic system depicted in FIG. 2 is provided with a plurality (two in the present embodiment) of hydraulic pumps 40*a* and 40*b*, a pilot pump 40*c*, a control valve V, operation devices 61 to 64, load pressure sensors 71*a*, 71*b*, 72*a*, 72*b*, 73*a*, 73*b*, 74*a*, and 74*b*, pump pressure sensors 80*a* and 80*b*, and a controller 100.

2-1. Hydraulic Pump

The hydraulic pumps 40*a* and 40*b* are hydraulic fluid sources of the respective hydraulic actuators mounted on the hydraulic excavator such as the boom cylinder 31, the arm cylinder 32, the bucket cylinder 33, and the swing motor 34, and suck hydraulic operating fluid from a hydraulic operating fluid tank T to deliver hydraulic fluid for driving the hydraulic actuators. These hydraulic pumps 40*a* and 40*b* are driven by a prime mover 45. An engine (internal combustion engine) is illustrated as the prime mover 45 in FIG. 2, but an electrically driven motor may be used as the prime mover 45. The hydraulic pumps 40*a* and 40*b* may be of a fixed displacement type, but a case in which a variable displacement type is used is illustrated in the present embodiment. Although FIG. 2 exemplifies the hydraulic system provided with the two hydraulic pumps 40*a* and 40*b*, but there is a case in which the hydraulic system is provided with three or more hydraulic pumps.

The hydraulic fluid delivered from the hydraulic pump 40*a* flows through a pump line PLa that is a delivery line of the hydraulic pump 40*a*, and is supplied to the respective hydraulic actuators such as the boom cylinder 31, the arm cylinder 32, the bucket cylinder 33, and the swing motor 34 via the control valve V. Return oil accordingly discharged from each hydraulic actuator flows into a tank line TL via the control valve V and returns to the hydraulic operating fluid tank T. In addition, the pump line PLa and the tank line TL are connected to each other via a bleed-off valve 43*a*. In a case where the delivery flow rate of the hydraulic pump 40*a* has a surplus with respect to the total target flow rate of the hydraulic actuators connected to the pump line PLa, the surplus is bypassed from the pump line PLa to the tank line TL via the bleed-off valve 43*a*. It should be noted that although not illustrated, the pump line PLa and the tank line TL are connected to each other via a relief valve for regulating the maximum pressure of the pump line PLa.

Similarly, the hydraulic fluid delivered from the hydraulic pump 40*b* flows through a pump line PLb that is a delivery line of the hydraulic pump 40*b*, and is supplied to the respective hydraulic actuators such as the boom cylinder 31, the arm cylinder 32, the bucket cylinder 33, and the swing motor 34 via the control valve V. Return oil accordingly discharged from each hydraulic actuator flows into the tank line TL via the control valve V and returns to the hydraulic operating fluid tank T. The pump line PLb and the tank line TL are connected to each other via a bleed-off valve 43*b*. In a case where the delivery flow rate of the hydraulic pump 40*b* has a surplus with respect to the total target flow rate of the hydraulic actuators connected to the pump line PLb, the surplus is bypassed from the pump line PLb to the tank line TL via the bleed-off valve 43*b*. Although not illustrated, the pump line PLb and the tank line TL are connected to each other via a relief valve for regulating the maximum pressure of the pump line PLb.

In the present embodiment, the hydraulic circuit of the boom cylinder 31, the hydraulic circuit of the arm cylinder 32, the hydraulic circuit of the bucket cylinder 33, and the hydraulic circuit of the swing motor 34 are connected in parallel to each of the pump lines PLa and PLb.

2-2. Pilot Pump

The pilot pump 40*c* is a fixed displacement-type pump that outputs power of a primary pressure (original pressure) of a pilot pressure for driving hydraulically-driven control valves included in the control valve V, such as directional control valves 41 to 43 and pump combiner valves 51*a*, 51*b*, 52*a*, 52*b*, 53*a*, 53*b*, 54*a*, and 54*b* (described later). The pilot pump 40*c* is driven by the prime mover 45 as similar to the hydraulic pumps 40*a* and 40*b*. However, the pilot pump 40*c* may be configured to be driven by a power source different from the prime mover 45.

A pilot primary pressure line PLc that is a delivery line of the pilot pump 40*c* is connected to solenoid valves 81, 81*a*, and 81*b* for generating a pilot pressure (pilot secondary pressure). The solenoid valves 81, 81*a*, and 81*b* are electromagnetically driven type proportional pressure reducing valves and are driven by a command signal from the controller 100. The solenoid valve 81 is a valve for generating a pilot pressure for driving the boom-driving directional control valve 41 (described later), generates the pilot secondary pressure by reducing the delivery pressure (pilot primary pressure) of the pilot pump 40*c*, and outputs the pilot secondary pressure to a pilot oil chamber of the directional control valve 41 via a pilot secondary pressure line 82. The pilot oil chamber of the directional control valve 41 (pilot secondary pressure line 82) is connected to the pilot primary pressure line PLc and the hydraulic operating fluid tank T at a rate specified by the solenoid valve 81.

Similarly, the solenoid valve 81*a* is a valve for generating a pilot pressure for driving the pump combiner valve 51*a* (described later), the solenoid valve 81*b* is a valve for generating a pilot pressure for driving the pump combiner valve 51*b* (described later), and the pilot secondary pressure is generated by reducing the delivery pressure (pilot primary pressure) of the pilot pump 40*c* and is output to pilot oil chambers of the pump combiner valves 51*a* and 51*b* via pilot secondary pressure lines 82*a* and 82*b*. The pilot oil chambers (pilot secondary pressure lines 82*a* and 82*b*) of the pump combiner valves 51*a* and 51*b* are connected to the pilot primary pressure line PLc and the hydraulic operating fluid tank T at rates specified by the solenoid valves 81*a* and 81*b*, respectively.

It should be noted that in FIG. 2, the three solenoid valves 81*a*, 81*a*, and 81*b* for controlling the hydraulic circuit of the boom cylinder 31 are representatively illustrated in order to prevent the drawing of the hydraulic circuit from being complicated, but the hydraulic circuits of the other hydraulic actuators such as the arm cylinder 32, the bucket cylinder 33, and the swing motor 34 are appropriately provided with necessary solenoid valves.

2-3. Control Valve

The control valve V is a control valve unit including various control valves for controlling the flow rate, direction, and supply source of the hydraulic fluid supplied to the respective hydraulic actuators such as the boom cylinder 31, the arm cylinder 32, the bucket cylinder 33, and the swing motor 34. As the control valves included in the control valve V, FIG. 2 depicts the directional control valves 41 to 44, the pump combiner valves 51*a*, 51*b*, 52*a*, 52*b*, 53*a*, 53*b*, 54*a*, and 54*b*, and the bleed-off valves 43*a* and 43*b*. These control valves are electrohydraulic displacement control type spool valves driven by the pilot pressures generated by the solenoid valves (for example, the solenoid valves 81, 81*a*, and 81*b*). The directional control valves 41 to 44 serve to control the flow (the direction and flow rate) of the hydraulic fluid to the boom cylinder 31, the arm cylinder 32, the bucket cylinder 33, and the swing motor 34. The pump combiner valves 51*a*, 51*b*, 52*a*, 52*b*, 53*a*, 53*b*, 54*a*, and 54*b* serve to control the supply flow rate (supply rate) of the hydraulic fluid supplied from the hydraulic pumps 40*a* and 40*b* to the corresponding hydraulic actuators. The bleed-off valves 43*a* and 43*b* serve to discharge the surplus flow rate flowing through the pump lines PLa and PLb to the tank line TL.

2-3a. Directional Control Valve

The directional control valve 41 for the boom cylinder 31 is driven by the pilot pressure input from the solenoid valve 81 into the pilot oil chamber thereof and the restoring force of a spring acting on the spool from the side opposite to the pilot oil chamber, and controls the supply/discharge and stop of the hydraulic fluid with respect to the boom cylinder 31. In the present embodiment, the directional control valve 41 having the pilot oil chamber only on one side of the spool is exemplified in FIG. 2, but a directional control valve 41 having the pilot oil chambers on both sides of the spool can also be used. In this case, one more solenoid valve is required in addition to the solenoid valve 81. In addition to the combining pump line 41L (combining line of the pump lines PLa and PLb) and the tank line TL, a bottom-side oil chamber and a rod-side oil chamber of the boom cylinder 31 are connected to each port of the directional control valve 41. When the combining pump line 41L is connected to the bottom-side oil chamber by the directional control valve 41, the boom cylinder 31 is extended and the boom 21 performs a boom raising operation. In contrast, when the combining pump line 41L is connected to the rod-side oil chamber by the directional control valve 41, the boom cylinder 31 is contracted and the boom 21 performs a boom lowering operation. In the neutral position, the connection between the boom cylinder 31 and the combining pump line 41L and the tank line TL is interrupted, and the boom cylinder 31 is stopped.

As similar to the directional control valve 41 for the boom cylinder 31, the directional control valve 42 for the arm cylinder 32, the directional control valve 43 for the bucket cylinder 33, and the directional control valve 44 for the swing motor 34 are also driven by the pilot pressure and the restoring force of a spring. It is obvious that the directional control valves 42 to 44 each having the pilot oil chambers on both sides of the spool can also be used. In addition to the combining pump lines 42L to 44L and the tank line TL, two ports of the corresponding hydraulic actuators are connected to each port of the directional control valves 42 to 44. When the combining pump line 42L is connected to the bottom-side oil chamber by the directional control valve 42, the arm cylinder 32 is extended and the arm 22 performs a crowding operation. On the contrary, when the combining pump line 42L is connected to the rod-side oil chamber by the directional control valve 42, the arm cylinder 32 is contracted and the arm 22 performs a dumping operation. When the directional control valve 42 returns to the neutral position, the arm cylinder 32 is stopped. Similarly, when the supply direction of the hydraulic fluid is switched by the directional control valves 43 and 44, the bucket cylinder 33 and the swing motor 34 are operated or stopped.

2-3b. Pump Combiner Valve

A first pump combiner valve 51*a* for the boom cylinder 31 is driven by the pilot pressure input from the solenoid valve 81*a* into the pilot oil chamber thereof and the restoring force of a spring acting on the spool from the side opposite to the pilot oil chamber. The pump line PLa of the hydraulic pump 40*a* is connected to the input port of the pump combiner valve 51*a*, and the combining pump line 41L is connected to the output port thereof. When the pump combiner valve 51*a* is opened, the delivery oil of the hydraulic pump 40*a* at a flow rate according to the opening degree flows into the combining pump line 41L. Similarly, a second pump combiner valve 51*b* for the boom cylinder 31 is driven by the pilot pressure from the solenoid valve 81*b* and the restoring force of a spring. The pump line PLb of the hydraulic pump 40*b* is connected to the input port of the pump combiner valve 51*b*, and the combining pump line 41L is connected to the output port thereof. When the pump combiner valve 51*b* is opened, the delivery oil of the hydraulic pump 40*b* at a flow rate according to the opening degree flows into the combining pump line 41L. In this manner, the supply source of the hydraulic fluid supplied to the boom cylinder 31 via the combining pump line 41L is controlled by the pump combiner valves 51*a* and 51*b*.

The pump combiner valves 52*a* and 52*b* for the arm cylinder 32, the pump combiner valves 53*a* and 53*b* for the bucket cylinder 33, and the pump combiner valves 54*a* and 54*b* for the swing motor 34 are also similar in the drive system and function to the pump combiner valves 51*a* and 51*b* for the boom cylinder 31. The pump combiner valves 52*a* and 52*b* control the supply source of the hydraulic fluid supplied to the arm cylinder 32 via the combining pump line 42L. The pump combiner valves 53*a* and 53*b* control the supply source of the hydraulic fluid supplied to the bucket cylinder 33 via the combining pump line 43L. The pump combiner valves 54*a* and 54*b* control the supply source of the hydraulic fluid supplied to the swing motor 34 via the combining pump line 44L.

2-3c. Bleed-Off Valve

The bleed-off valve 43*a* is driven by the pilot pressure input from a solenoid valve 83*a* (FIG. 3) into the pilot oil chamber thereof and the restoring force of a spring acting on the spool from the side opposite to the pilot oil chamber. The pump line PLa of the hydraulic pump 40*a* is connected to the input port of the bleed-off valve 43*a*, and the tank line TL is connected to the output port thereof. When the bleed-off valve 43*a* is opened, a flow rate according to the opening degree is discharged from the pump line PLa to the tank line TL.

As similar to the bleed-off valve 43*a*, the bleed-off valve 43*b* is driven by the pilot pressure input from a solenoid valve 83*b* (FIG. 3) into the pilot oil chamber thereof and the restoring force of a spring. The pump line PLb of the hydraulic pump 40*b* is connected to the input port of the bleed-off valve 43*b*, and the tank line TL is connected to the output port thereof. When the bleed-off valve 43*b* is opened, a flow rate according to the opening degree is discharged from the pump line PLb to the tank line TL.

2-4. Operation Device

The operation devices 61 to 64 are operation devices for operating the directional control valves 41 to 44 and the corresponding hydraulic actuators, and are installed inside the operation room 16. In FIG. 2, the operation devices 61 to 64 are illustrated as one device. The operation device 61 is an operation lever device for boom operation for operating the boom cylinder 31. The operation device 62 is an operation lever device for arm operation for operating the arm cylinder 32. The operation device 63 is an operation lever device for bucket operation for operating the bucket cylinder 33. The operation device 64 is an operation lever device for swing operation for operating the swing motor 34. Although not illustrated in FIG. 2, in a case where another hydraulic actuator is operated in the hydraulic excavator, an operation device for operating the hydraulic actuator is provided.

In the present embodiment, the operation devices 61 to 64 are electric lever devices, and the direction and operation amount of the lever operation are sensed by a sensor, and an operation signal (electric signal) in response to the lever operation is output to the controller 100. When the operation devices 61 to 64 are operated, a command signal in response to the operation signal is output from the controller 100 to the solenoid valves 81 to 84, the directional control valves 41 to 44 are driven in response to the pilot pressures output from the solenoid valves 81 to 84, and the boom cylinder 31, the arm cylinder 32, the bucket cylinder 33, and the swing motor 34 are operated in response to the operations.

However, the operation devices 61 to 64 can be of a pilot operation type in which the pilot valve is operated by a lever. In a case where the operation devices 61 to 64 are of a pilot operation type, the pilot pressure (hydraulic signal) is generated by reducing the delivery pressure of the pilot pump 40*c* by the pilot valve, the directional control valves 41 to 44 are driven by the pilot pressure, and the boom cylinder 31, the arm cylinder 32, the bucket cylinder 33, and the swing motor 34 are operated. In this case, the pilot pressure or the lever operation amount output from the pilot valve is sensed by a sensor, and a sensor output (electric signal) is output to the controller 100 as an operation signal in response to the lever operation.

2-5. Load Pressure Sensor

The load pressure sensors 71*a*, 71*b*, 72*a*, 72*b*, 73*a*, 73*b*, 74*a*, and 74*b* are pressure sensors for sensing the load pressure of the corresponding hydraulic actuator among the boom cylinder 31, the arm cylinder 32, the bucket cylinder 33, and the swing motor 34.

The load pressure sensors 71*a* and 71*b* are for the boom cylinder 31. The pressure of the rod-side oil chamber of the boom cylinder 31 is sensed by the load pressure sensor 71*a*, the pressure of the bottom-side oil chamber thereof is sensed by the load pressure sensor 71*b*, and each pressure is output to the controller 100 as the load pressure of the boom cylinder 31.

The load pressure sensors 72*a* and 72*b* are for the arm cylinder 32. The pressure of the rod-side oil chamber of the arm cylinder 32 is sensed by the load pressure sensor 72*a*, the pressure of the bottom-side oil chamber thereof is sensed by the load pressure sensor 72*b*, and each pressure is output to the controller 100 as the load pressure of the arm cylinder 32.

The load pressure sensors 73*a* and 73*b* are for the bucket cylinder 33. The pressure of the rod-side oil chamber of the bucket cylinder 33 is sensed by the load pressure sensor 73*a*, the pressure of the bottom-side oil chamber thereof is sensed by the load pressure sensor 73*b*, and each pressure is output to the controller 100 as the load pressure of the bucket cylinder 33.

The load pressure sensors 74*a* and 74*b* are for the swing motor 34. The pressure of one hydraulic port of the swing motor 34 is sensed by the load pressure sensor 74*a*, the pressure of the other hydraulic port is sensed by the load pressure sensor 74*b*, and each pressure is output to the controller 100 as the load pressure of the swing motor 34.

2-6. Pump Pressure Sensor

The pump pressure sensors 80*a* and 80*b* are pressure sensors for sensing the pump delivery pressures of the hydraulic pumps 40*a* and 40*b*. The pump pressure sensor 80*a* is provided in the pump line PLa of the hydraulic pump 40*a*, and senses the pump delivery pressure of the hydraulic pump 40*a* to be output to the controller 100. The pump pressure sensor 80*ab* is provided in the pump line PLb of the hydraulic pump 40*b*, and senses the pump delivery pressure of the hydraulic pump 40*b* to be output to the controller 100.

2-7. Operation Outline of Hydraulic System

An operation outline of the hydraulic system will be described by using a case of operating the boom cylinder 31 as an example. When the operation device 61 is operated, the solenoid valve 81 is controlled by the controller 100 according to the operation of the operation device 61, the pilot operation is performed by the solenoid valve 81 to drive the directional control valve 41 according to the operation, and the boom cylinder 31 is operated. Accordingly, the boom 21 is operated in a direction according to the operation direction of the operation device 61 at a speed according to the operation amount of the operation device 61.

At this time, according to the operation patterns of the operation devices 61 to 64, the load pressure of the boom cylinder 31, and the patterns of the pump delivery pressures of the hydraulic pumps 40*a* and 40*b*, the pump combiner valves 51*a* and 51*b* are controlled by the controller 100, and the supply source of the hydraulic fluid to the boom cylinder 31 is switched. Depending on the opening and closing states of the pump combiner valves 51*a* and 51*b*, the hydraulic fluid may be supplied to the boom cylinder 31 from only the hydraulic pump 40*a* of the hydraulic pumps 40*a* and 40*b*, or the hydraulic fluid may be supplied to the boom cylinder 31 from only the hydraulic pump 40*b* of the hydraulic pumps 40*a* and 40*b*. In addition, the hydraulic fluid may be supplied to the boom cylinder 31 from both of the hydraulic pumps 40*a* and 40*b*. The control of the pump combiner valves 51*a* and 51*b* and the like will be described later.

In addition, in a case where the flow rate flowing through the pump lines PLa and PLb is larger than the required flow rate of the hydraulic actuator, the bleed-off valves 43*a* and 43*b* are controlled by the controller 100, and the surplus hydraulic fluid is bypassed from the pump lines PLa and PLb to the tank line TL.

Operations and the like of the arm cylinder 32 when operating another operation device, for example, operating the operation device 62 are similar to those described above.

3. Controller

FIG. 3 depicts an essential part of a functional block diagram of the controller 100. In FIG. 3, functions related to the boom operation are depicted, but the arm operation, the bucket operation, the swing operation, or operations of the other hydraulic actuators can also be represented by a similar functional block diagram by replacing the relationship between the operation and the target actuator.

The controller 100 is a control device including at least one in-vehicle computer mounted on the hydraulic excavator, and has a function (a pump combiner valve control section 114) for controlling the pump combiner valves 51*a*, 51*b*, 52*a*, 52*b*, 53*a*, 53*b*, 54*a*, and 54*b* according to the operation signals of the operation devices 61 to 64, the load pressure of each hydraulic actuator, and the like, in addition to the described function (a directional control valve control section 111 in FIG. 3) for controlling the directional control valves 41 to 44 and the like according to the operations of the operation devices 61 to 64 and the like. In addition, the controller 100 has a function (a bleed-off valve control section 112) for controlling the bleed-off valves 43*a* and 43*b* according to the operations of the operation devices 61 to 64 and the like.

To the controller 100, operation signals in response to the operations of the operation devices such as the operation devices 61 to 64, a mode selection signal from a mode selection dial 48, load pressures from the load pressure sensors 71*a*, 71*b*, 72*a*, 72*b*, 73*a*, 73*b*, 74*a*, and 74*b*, and pump delivery pressures from the pump pressure sensors 80*a* and 80 are sequentially input during the operation of the hydraulic excavator.

The mode selection dial 48 is an operation device mounted on the hydraulic excavator to switch a work mode such as a work amount priority mode or a fuel efficiency priority mode, and is installed in the operation room 16 on which the operator rides. The mode selection dial 48 includes a sensor for sensing the selected position of the dial and outputs the work mode sensed by the sensor to the controller 100.

The "work amount priority mode" is a work mode in which the shortage of a suppliable flow rate relative to a target flow rate is compensated by the supply flow rate of a non-priority pump in a case where the target flow rate according to a first operation device (described later) exceeds the suppliable flow rate supplied from a priority pump (described later). In the work amount priority mode, the control valve V is controlled such that the maximum target flow rate is supplied within a range not exceeding the total value of the deliverable flow rates of the hydraulic pumps 40*a* and 40*b* at that time relative to the total required flow rate of the hydraulic actuators during the operation. In this mode, in a case where the suppliable flow rate from the hydraulic pump (for example, the hydraulic pump 40*a*) designated as the priority pump (described later) is insufficient for the target flow rate of a first hydraulic actuator (for example, the boom cylinder 31), the shortage is compensated by the non-priority pump (described later).

The "fuel efficiency priority mode" is a work mode in which a target flow rate according to the first operation device is limited by a suppliable flow rate in a case where the target flow rate according to the first operation device (described later) exceeds the suppliable flow rate supplied from the priority pump (described later). On the other hand, in the fuel efficiency priority mode, a flow dividing restriction loss is suppressed instead of limiting the supply flow rate supplied to each hydraulic actuator as compared with the work amount priority mode. In this mode, in a case where the suppliable flow rate of the corresponding priority pump is insufficient for the target flow rate of each hydraulic actuator during the operation, the pump combiner valves are controlled such that the target flow rate of the hydraulic actuator is limited by the suppliable flow rate of the priority pump and the hydraulic fluid from the non-priority pump is not combined.

The "first operation device" is an operation device that is one of the operation devices, such as the operation devices 61 to 64, for operating the hydraulic actuators, and operates the first hydraulic actuator (described later). In the example of FIG. 3, the operation device 61 for boom operation is the first operation device. For example, regarding the arm operation, the operation device 62 for arm operation is the first operation device.

It should be noted that in the present embodiment, regarding the control of the pump combiner valves, the operation signals of the operation devices other than the corresponding operation device (first operation device) are also considered for identifying the operation pattern. Therefore, for convenience, the operation devices other than the first operation device are described as "second operation devices." In the example of FIG. 3, the operation devices 62 to 64 for arm operation, bucket operation, and swing operation are represented as the second operation devices.

The "priority pump" is a pump that is selected from among a plurality of hydraulic pumps (that is, the hydraulic pumps 40*a* and 40*b* in the present embodiment) serving as hydraulic fluid sources for the hydraulic actuators and preferentially supplies the hydraulic fluid to the first hydraulic actuator.

The "first hydraulic actuator" is the hydraulic actuator corresponding to the first operation device, and is the hydraulic actuator that uses a plurality of hydraulic pumps (hydraulic pumps 40*a* and 40*b*) as hydraulic fluid sources. In the example of FIG. 3, the boom cylinder 31 is the first hydraulic actuator. For example, in the case of the arm operation, the arm cylinder 32 is the first hydraulic actuator.

It should be noted that among the hydraulic actuators mounted on the hydraulic excavator, the hydraulic actuators other than the first hydraulic actuator that can share the hydraulic fluid source with the first hydraulic actuator in terms of a circuit are described as "second hydraulic actuators". It is not necessary for the second hydraulic actuators to be hydraulic actuators that use a plurality of hydraulic pumps as hydraulic fluid sources, but at least one hydraulic pump is used as a hydraulic fluid source. In the example of FIG. 3, the arm cylinder 32, the bucket cylinder 33, and the swing motor 34 are the second hydraulic actuators. In the example of FIG. 3, the boom cylinder 31 is the first hydraulic actuator, but becomes the second hydraulic actuator when the arm operation is performed. The second hydraulic actuator corresponds to the second operation device. In other words, the second operation device is the second hydraulic actuator, that is, the operation device for operating the hydraulic actuator that can share the hydraulic fluid source with the first hydraulic actuator, and the operation device for the hydraulic actuator that cannot share the hydraulic fluid source with the first hydraulic actuator in terms of a circuit can be considered to be excluded from the second operation devices.

The "non-priority pump" is the hydraulic pump excluding the priority pump among a plurality of hydraulic pumps (hydraulic pumps 40*a* and 40*b* in the present embodiment) serving as the hydraulic fluid sources of the hydraulic actuators. In a case where the target flow rate cannot be supplied to the first hydraulic actuator only by the priority pump, the delivery oil of the non-priority pump is combined with the supply flow rate supplied to the first hydraulic actuator. Since the two hydraulic pumps are provided in the present embodiment, the priority pump is necessarily one of the hydraulic pumps 40*a* and 40*b*, and the non-priority pump is the other one of the hydraulic pumps 40*a* and 40*b*, but in a case where three or more hydraulic pumps are provided, any one of the hydraulic pumps is the priority pump and the other hydraulic pumps are the non-priority pumps, and in a case where the suppliable flow rate of the priority pump is insufficient for the target flow rate of the first hydraulic actuator, the flow rate is supplemented from one or more non-priority pumps.

As depicted in FIG. 3, the controller 100 is provided with a required flow rate computation section 101, a work mode sensing section 102, a deliverable flow rate computation section 103, and a valve control section 110. The required flow rate computation section 101, the work mode sensing section 102, the deliverable flow rate computation section 103, and the valve control section 110 are functions of the controller 100, and may be virtually realized by software, or may be realized by hardware such as an electronic circuit. As described above, FIG. 3 is a functional block diagram for depicting the boom operation, and the boom operation will be described in the description of FIG. 3. The following description of the boom operation can be substituted for operations of the other hydraulic actuators.

3-1. Required Flow Rate Computation Section

The required flow rate computation section 101 computes the required flow rate of the boom cylinder 31 that is the first hydraulic actuator to be operated, on the basis of an operation signal (first operation signal) input in response to the operation of the operation device 61 (first operation device). The required flow rate of the boom cylinder 31 is computed from, for example, the target speed of the boom cylinder 31 according to the lever operation amount of the operation device 61.

3-2. Work Mode Sensing Section

The work mode sensing section 102 senses a work mode on the basis of an operation signal of the mode selection dial 48. In the present embodiment, either the work amount priority mode or the fuel efficiency priority mode is alternatively sensed.

3-3. Deliverable Flow Rate Computation Section

The deliverable flow rate computation section 103 computes the respective deliverable flow rates of the hydraulic pumps 40*a* and 40*b* on the basis of the pump delivery pressures sensed by the pump pressure sensors 80*a* and 80*b*. For example, for the hydraulic pumps 40*a* and 40*b*, the maximum deliverable flow rates within a range not exceeding a predetermined torque limit value are computed as the deliverable flow rates on the basis of the pump delivery pressures.

3-4. Valve Control Section

The valve control section 110 inputs the required flow rate of the boom cylinder 31 computed by the required flow rate computation section 101, the work mode sensed by the work mode sensing section 102, the deliverable flow rates of the hydraulic pumps 40*a* and 40*b* computed by the deliverable flow rate computation section 103, the operation signals of the operation devices 61 to 64, the pump delivery pressures of the hydraulic pumps 40*a* and 40*b* sensed by the pump pressure sensors 80*a* and 80*b*, and the load pressure of the boom cylinder 31 sensed by the load pressure sensors 71*a* and 71*b*, computes command values (excitation current values) to the solenoid valves 81, 81*a*, 81*b*, 83*a*, and 83*b*, and outputs command signals (excitation currents) to the solenoid valves.

Specifically, the valve control section 110 is provided with a directional control valve control section 111, a bleed-off valve control section 112, a priority pump storage section 113, a pump combiner valve control section 114, and a priority pump learning section 115. The controller 100 has a first function for controlling the operations of the pump combiner valves 51*a*, 51*b*, and the like and a second function for learning priority pump data (described later), with respect to control of the pump combiner valves. The pump combiner valve control section 114 corresponds to the first function, and the priority pump learning section 115 corresponds to the second function.

3-4a. Directional Control Valve Control Section

The directional control valve control section 111 computes the opening area with which each of the bottom-side oil chamber and the rod-side oil chamber of the boom cylinder 31 is communicated with the combining pump line 41L, on the basis of the operation signal of the operation device 61 for the boom, and outputs a command signal to the solenoid valve 81.

3-4b. Bleed-Off Valve Control Section

The bleed-off valve control section 112 outputs command signals to the solenoid valves 83*a* and 83*b* for the bleed-off valves 43*a* and 43*b* such that a surplus is discharged to the tank line TL via the bleed-off valves 43*a* and 43*b* in a case where each delivery flow rate of the hydraulic pumps 40*a* and 40*b* has the surplus with respect to the total flow rate supplied to each hydraulic actuator such as the boom cylinder 31.

3-4c. Priority Pump Storage Section

The priority pump storage section 113 stores priority pump data (for example, a relational database) that specifies a priority pump corresponding to the boom cylinder 31 (first hydraulic actuator) according to the operation of the operation device 51 (first operation device) for each operation load pattern. The "operation load pattern" is classified according to operation patterns of the boom cylinder 31 (first hydraulic actuator) and the arm cylinder 32 and the like (second hydraulic actuators), and a load pattern of the hydraulic circuit of the boom cylinder 31 (first hydraulic actuator).

FIG. 6 depicts an example of the priority pump data. As depicted in the drawing, the operation pattern is classified according to, for example, the hydraulic actuator during the operation at the time when the first operation signal from the first operation device is input, and the required flow rate of the first hydraulic actuator. FIG. 6 depicts an example of the priority pump data related to the operation of the arm cylinder 32 in the work amount priority mode, and the order of operation of the first hydraulic actuator (the arm cylinder 32 in the example of FIG. 6), the required flow rate of the first hydraulic actuator (the arm cylinder 32 in the example of FIG. 6), and the second hydraulic actuators (for example, the boom cylinder 31 and the like) operating in advance are adopted as classification items of the operation pattern. The order of operation of the first hydraulic actuator and the second hydraulic actuators operating in advance can be specified from, for example, the second operation signal at the time when the first operation signal is input. The required flow rate of the first hydraulic actuator is computed by the required flow rate computation section 101 as described above. The load pattern is classified according to the load pressure of the first hydraulic actuator (the arm cylinder 32 in the example of FIG. 6) and the pump delivery pressures of the hydraulic pumps 40*a* and 40*b* at the time when the first operation signal is input.

The priority pump data as depicted in FIG. 6 is stored in the priority pump storage section 113 for each combination of the hydraulic actuator to be operated and the work mode. Although not represented in FIG. 6, the priority pump data may be divided for each operation direction of the operation device. For example, FIG. 6 may be used as the priority pump data for the arm crowding operation in the work amount priority mode, and priority pump data at the time of the arm dumping operation may be separately prepared for the arm operation in the same work amount priority mode.

It should be noted that as will be described later, the priority pump data is referred to every time by the controller 100 when the control valve V is controlled in response to the first operation signal in accordance with the operation of the first hydraulic actuator, and can be updated at a predetermined timing by the priority pump learning section 115 when actual result data on the first operation signal, the second operation signal, the load pressure, and the pump delivery pressure is accumulated according to the operation of the hydraulic excavator.

However, at a stage where the actual result data is not accumulated, such as when the hydraulic excavator is shipped or immediately after the actual result data is initialized, preset initial data of the priority pump data is recorded in the priority pump storage section 113. The initial data is set assuming, for example, the standard use of the hydraulic excavator. As the standard use, for example, a JACMAS fuel efficiency measurement mode or big data on GeS machine operation information can be assumed as a reference. Under the assumption of the standard use, the initial data of the priority pump data can be set from the following points of view.

a. The priority pumps are separately set for two hydraulic actuators that are frequently used (for example, the hydraulic pump 40*a* is set for the boom cylinder 31 as the priority pump and the hydraulic pump 40*b* is set for the arm cylinder 32 as the priority pump).

b. The priority pumps are separately set for two hydraulic actuators that frequently perform combined operations (for example, the hydraulic pump 40*a* is set for the bucket cylinder 33 as the priority pump and the hydraulic pump 40*b* is set for the arm cylinder 32 as the priority pump).

c. The hydraulic actuator that tends to increase the load pressure zone when combined operations are performed at the time of a specific operation of the hydraulic actuator is not connected to the priority pump of the hydraulic actuator whose required flow rate is frequently increased (for example, the boom cylinder 31 and the swing motor 34 are not connected to the same hydraulic pump at the time of the boom raising operation).

The same hydraulic pump is set for the hydraulic actuators whose load pressure zones are close to each other as the priority pump (for example, the boom cylinder 31 and the bucket cylinder 33 are connected to the same hydraulic pump at the time of combined operations of boom lowering and bucket dumping).

It should be noted that in a case where the initial data is not set in advance, the priority pump may be switched in order or randomly for each hydraulic actuator to accumulate the actual result data for a certain period (for example, a period until the actual result data for a certain number of times is accumulated for each operation load pattern), and the priority pump for each operation load pattern of each hydraulic actuator may be automatically decided on the basis of the actual result data. In this case, for example, optimization index data (described later) can be sequentially computed and recorded in the process of accumulating the actual result data, and the optimization index data for a predetermined number of times can be statistically calculated for each operation load pattern to create the priority pump data. In this case, since the operation load pattern of the hydraulic excavator is complicated, it is desirable to average the optimization index data for a sufficient period and a sufficient number of times during statistics.

3-4d. Pump Combiner Valve Control Section

Referring back to FIG. 3, when the operation device 61 (first operation device) is operated, the pump combiner valve control section 114 controls the pump combiner valves 51*a* and 51*b* on the basis of the first operation signal input in response to the operation of the operation device 61, the second operation signals input in response to the operations of the operation devices 62 to 64 (second operation devices), the required flow rate of the boom cylinder 31 (first hydraulic actuator), the deliverable flow rates of the hydraulic pumps 40*a* and 40*b*, the work mode, and the priority pump data. For example, when the boom operation signal (first operation signal) is input, the pump combiner valve control section 114 first computes the total required flow rate of the currently operated hydraulic actuators on the basis of the boom operation signal and the other input second operation signals. Next, the pump combiner valve control section 114 computes a flow rate reduction ratio by dividing the total value of the deliverable flow rates of the hydraulic pumps 40*a* and 40*b* by the total required flow rate, and computes the target flow rate supplied to the boom cylinder 31 by multiplying the required flow rate of the boom cylinder 31 by the flow rate reduction ratio. The flow rate reduction ratio is a value equal to or less than 1, and is computed as 1 when the total value of the deliverable flow rates is larger than the total required flow rate. Then, on the basis of the operation signals of the operation devices 61 to 64, the load pressure of the boom cylinder 31, the pump delivery pressure, and the like, the pump combiner valve control section 114 specifies a priority pump having the corresponding operation load pattern, and outputs a command signal to the solenoid valves 81*a* and 81*b* to control the opening degrees of the pump combiner valves 51*a* and 51*b* such that the target flow rate is supplied to the boom cylinder 31 (first hydraulic actuator).

3-4e. Priority Pump Learning Section

The priority pump learning section 115 performs machine learning of the suitability of the priority pump data for each operation load pattern on the basis of the actual result data stored in a memory of the controller 100 in conjunction with the operation, and automatically updates the priority pump data for each operation load pattern. Specifically, the priority pump learning section 115 samples required data from the actual result data for each operation load pattern, and computes an actual computation value of a predetermined optimization index set in advance for the operation of the first operation device under an implementation condition in which the hydraulic fluid is preferentially supplied to the first hydraulic actuator from the priority pump, on the basis of the sampled actual result data. As the optimization index, the present embodiment computes a flow dividing restriction loss generated as a result of dividing and supplying the hydraulic fluid from the same hydraulic pump to the first hydraulic actuator and the other hydraulic actuators (second hydraulic actuators). At the same time, the priority pump learning section 115 computes a trial compotation value of the optimization index for the operation of the first operation device under a virtual condition in which the hydraulic fluid is preferentially supplied to the first hydraulic actuator from the non-priority pump, on the basis of the actual result data sampled in the same manner. Thereafter, the priority pump learning section 115 compares the computed actual computation value with the trial computation value, and when the trial computation value is better than the actual computation value, the priority pump data on the corresponding operation load pattern is changed by reflecting the virtual condition. When the actual computation value is better than the trial computation value, the setting of the priority pump is maintained without being changed.

It should be noted that as the actual result data in which the value of the optimization index is used for the computation, data from the input point of the first operation signal to be evaluated until the input stop point is sampled. In addition, it is desirable, from the viewpoint of eliminating the influence of irregular data, not to determine the suitability of the priority pump by comparing the optimization index for one operation for a certain operation load pattern, but to decide the priority pump by comparing the optimization index computed on the basis of the total value or the average value of the actual result data on operations for a plurality of times (an arbitrary number of settings) in the past, or to decide, as the priority pump, a hydraulic pump having the largest number of times to be selected as the priority pump by comparing the optimization index for each of operations for a plurality of times in the past. In addition, where it is not desirable that the obtained actual result data serves as the basis for determining the priority pump such as a case where the hydraulic excavator is used for special work or the like, it is also conceivable that the function of the priority pump learning section 115 can be turned off. In this case, the actual result data while the function of the priority pump learning section 115 is turned off cannot be used or accumulated for the subsequent computation of the optimization index.

Further, when the optimization index is newly computed, it is also conceivable to adjust the difficulty of changing the priority pump for each operation load pattern by weighting the comparison result history (for example, the number of times selected as the priority pump for each hydraulic pump) of the optimization index at the time of shipment of the hydraulic excavator or immediately after the initialization of the actual result data, or by taking into account the trend (for example, the hydraulic pump 40*a* has been selected as the priority pump N times in a row) of the most recent comparison results.

4. Pump Combiner Valve Control

Control of the pump combiner valves by the controller 100 will be described by using FIG. 4 to FIG. 7. In the examples depicted in FIG. 4 to FIG. 7, a case in which the work amount priority mode is selected, a boom single operation, two combined operations of boom and swing, and four combined operations of boom, swing, arm, and bucket are performed in this order from a non-operation state in which none of the operation devices 61 to 64 is operated, and the state is returned to the non-operation state will be described as an example.

When the operation lever of the operation device 61 is operated, for example, in the boom raising direction at time T0, the required flow rate computation section 101 computes the required flow rate of the boom cylinder 31 on the basis of an operation signal input from the operation device 61 and outputs the computed flow rate to the valve control section 110. At the same time, the work mode sensing section 102 senses the work amount priority mode and outputs it to the valve control section 110. In addition, the deliverable flow rate computation section 103 computes the deliverable flow rate of the hydraulic pump 40*a* on the basis of the pump delivery pressure input from the pump pressure sensor 80*a* and the deliverable flow rate of the hydraulic pump 40*b* on the basis of the pump delivery pressure input from the pump pressure sensor 80*b*, and outputs them to the valve control section 110.

The pump combiner valve control section 114 computes the flow rate reduction ratio from the total required flow rate of the hydraulic actuators and the total deliverable flow rate of the hydraulic pumps 40*a* and 40*b* as described above, and computes the target flow rate supplied to the boom cylinder 31 by multiplying the required flow rate of the boom cylinder 31 by the flow rate reduction ratio. Next, the pump combiner valve control section 114 calls, from the priority pump storage section 113, a record of the priority pump corresponding to the operation load pattern at the time when the operation signal is input in response to the operation of the operation device 61. Assuming that the called priority pump is the hydraulic pump 40*a*, the pump combiner valve control section 114 assigns the target flow rate of the boom cylinder 31 to the pump combiner valve 51*a*. Since the target flow rate of the boom cylinder 31 is smaller than the deliverable flow rate of the hydraulic pump 40*a* at time T0, all of the target flow rate of the boom cylinder 31 can be supplied from the hydraulic pump 40*a*, and the target flow rate of the pump combiner valve 51*b* is set to zero. As a result, the pump combiner valve 51*a* is controlled to have an opening degree according to the target flow rate, and the hydraulic fluid is supplied to the boom cylinder 31 from only the hydraulic pump 40*a* via the directional control valve 41.

When the operation amount of the operation device 61 increases and the supply flow rate from the hydraulic pump 40*a* becomes insufficient for the target flow rate at time T1, the target flow rate for the shortage is set in the pump combiner valve 51*b*. As a result, the pump combiner valve 51*b* is controlled to have an opening degree according to the insufficient flow rate, and the hydraulic fluid from the hydraulic pumps 40*a* and 40*b* is combined to be supplied to the boom cylinder 31.

When the lever of the operation device 64 is operated at time T2, the required flow rate computation section 101 computes the required flow rate of the swing motor 34 and outputs it to the valve control section 110. The pump combiner valve control section 114 computes the target flow rate supplied to the swing motor 34 by the above-described method. At this time, assuming that the total required flow rate of the boom cylinder 31 and the swing motor 34 exceeds the total deliverable flow rate of the hydraulic pumps 40*a* and 40*b*, the flow rate reduction ratio becomes a value smaller than 1. The required flow rates of the boom cylinder 31 and the swing motor 34 are reduced by being multiplied by the flow rate reduction ratio, and the target flow rate of each of the boom cylinder 31 and the swing motor 34 becomes small with respect to the required flow rate. However, the ratio of the required flow rate of the boom cylinder 31 to that of the swing motor 34 is maintained.

Subsequently, the pump combiner valve control section 114 calls, from the priority pump storage section 113, a record of the priority pump corresponding to the operation load pattern at the time when the operation signal related to the swing is input. Assuming that the called priority pump related to the operation of the swing motor 34 is the hydraulic pump 40*b*, the pump combiner valve control section 114 first assigns the target flow rate of the swing motor 34 to the pump combiner valve 54*b* for the swing. Since the target flow rate of the swing motor 34 is smaller than the deliverable flow rate of the hydraulic pump 40*b* at time T2, all of the target flow rate can be supplied from the hydraulic pump 40*b* to the swing motor 34, and the target flow rate of the pump combiner valve 54*a* for the swing is set to zero. As a result, the pump combiner valve 54*b* is controlled to have an opening degree according to the target flow rate, and the hydraulic fluid is supplied to the swing motor 34 from only the hydraulic pump 40*b* via the directional control valve 44 for the swing.

Here, the lowermost graph of FIG. 4 depicts a flow dividing restriction loss. At time T2, the hydraulic pump 40*b* supplies the flow rate to two hydraulic actuators of the boom cylinder 31 and the swing motor 34. Therefore, the opening area of the pump combiner valve 54*b* corresponding to the swing motor 34 having a lower load pressure than that of the boom cylinder 31 is controlled to be small and a pressure loss is generated, so that the flow rate conforming to the target flow rate is supplied from the hydraulic pump 40*b* to each of the three hydraulic actuators. At this time, the product of the difference in load pressure between the boom cylinder 31 and the swing motor 34 and the supply flow rate to the swing motor 34 is the flow dividing restriction loss.

When the load pressure of the swing motor 34 increases at time T3, the deliverable flow rates of the hydraulic pumps 40*a* and 40*b* decrease. As a result, the sequentially-computed flow rate reduction ratio becomes much smaller, and the supply flow rate to the boom cylinder 31 and the swing motor 34 decreases with the target flow rate.

When the boom operation amount by the operation device 61 decreases at time T4, the target flow rate of the boom cylinder 31 falls below the suppliable flow rate of the hydraulic pump 40*a*, and all of the target flow rate is supplied to the boom cylinder 31 from the hydraulic pump 40*a*.

Thereafter, when the arm operation is performed by the operation device 62 at time T5 and then the bucket operation is performed by the operation device 63, the required flow rate computation section 101 computes the required flow rate of the arm cylinder 32 and the required flow rate of the bucket cylinder 33 for the arm operation and the bucket operation as similar to the above, and outputs them to the valve control section 110.

In addition, the pump combiner valve control section 114 computes the target flow rate of the arm cylinder 32 by the above-described method, and calls, from the priority pump storage section 113, a record of the priority pump for the arm cylinder 32 corresponding to the operation load pattern at time T5. As described above, the priority pump data is created in the form depicted in, for example, FIG. 6. Assuming that the operation load pattern at time T5 corresponds to data in the column surrounded by a thick frame in FIG. 6, the hydraulic pump 40*b* (pump 2 in FIG. 6) is read as the priority pump. Accordingly, the pump combiner valve control section 114 first assigns the target flow rate of the arm cylinder 32 to the pump combiner valve 52*b* for the arm. As a result, the pump combiner valve 52*b* for the arm is controlled to have an opening degree according to the target flow rate, and the hydraulic fluid is supplied to the arm cylinder 32 from only the hydraulic pump 40*b* through the directional control valve 42.

When the arm operation amount by the operation device 62 increases between time T6 and time T7 and a shortage occurs in the supply flow rate from the hydraulic pump 40*b*, the target flow rate for the shortage is set in the pump combiner valve 52*a* for the arm. As a result, the pump combiner valve 52*a* for the arm is controlled to have an opening degree according to the insufficient flow rate, and the hydraulic fluid from the hydraulic pumps 40*a* and 40*b* is combined to be supplied to the arm cylinder 32.

In addition, the priority pump learning section 115 sequentially (or at a predetermined timing thereafter) computes the actual computation value and the trial computation value of the flow dividing restriction loss. FIG. 5(*a*) is a schematic diagram of the computation result of the actual computation value at time T6, FIG. 5(*b*) is a schematic diagram of the computation result of the trial computation value at time T6, FIG. 5(*c*) is a schematic diagram of the computation result of the actual computation value at time T7, and FIG. 5(*d*) is a schematic diagram of the computation result of the trial computation value at time T7.

The actual computation value is computed according to the assignment of the hydraulic pumps 40*a* and 40*b* actually applied to the respective hydraulic actuators. Since the delivery oil of the hydraulic pump 40*a* is supplied to the boom cylinder 31 and the bucket cylinder 33 at time T6, the product of the difference between the load pressure of the boom cylinder 31, which is the highest load pressure on the hydraulic pump 40*a* side, and the load pressure of the bucket cylinder 33 and the supply flow rate to the bucket cylinder 33 is the flow dividing restriction loss related to the bucket.

On the other hand, the delivery oil of the hydraulic pump 40*b* is supplied to the swing motor 34, the arm cylinder 32, and the bucket cylinder 33 at time T6. Therefore, first, the product of the difference between the load pressure of the arm cylinder 32, which is the highest load pressure on the hydraulic pump 40*b* side, and the load pressure of the swing motor 34 and the supply flow rate to the swing motor 34 is the flow dividing restriction loss related to the swing. In addition, the flow dividing restriction loss related to the bucket is similarly obtained.

For time T7, the actual computation value of the flow dividing restriction loss is computed by the similar method.

The trial computation value is computed by assuming the condition that the hydraulic fluid is preferentially supplied to each hydraulic actuator from the non-priority pump. For example, the flow dividing restriction loss is computed by assuming a case in which the priority pump of the arm cylinder 32 is the hydraulic pump 40*a*.

In the example of FIG. 4, the load pressure and the operation amount (required flow rate) of the arm cylinder 32 and the load pressure of the bucket cylinder 33 are significantly different between time T6 and time T7. Therefore, the magnitude of the flow dividing restriction loss is also significantly different between time T6 and time T7. Since the recorded priority pump data is a learning result based on past actual result data (operation information monitoring data), a case in which the load pressure and the operation amount (required flow rate) change in the middle of the operation in this way is reflected, and as a result, the integral value of the loss until the operation command is released can be made small.

When the input of the operation signals from the operation devices 61 to 64 is stopped at time T8, the priority pump learning section 115 computes and compares each integral value of the actual computation value and the trial computation value of the flow dividing restriction loss for each operation. For example, in the case of the arm operation, the actual loss data (operation information monitoring data) from time T5 to time T8 is sampled, and each integral value of the actual computation value and the trial computation value is computed and compared. FIG. 7 depicts the computation result. In the example of FIG. 7, since the actual computation value is smaller and better than the trial computation value, the priority pump learning section 115 determines that the hydraulic pump 40*b* is appropriate as currently recorded, as the priority pump related to the arm cylinder 32 corresponding to the operation load pattern at time T5 related to the arm operation, and outputs data on the determination result to the priority pump storage section 113. If the trial computation value is better than the actual computation value, the virtual condition is reflected in the priority pump data, and the hydraulic pump as the target of the priority pump can be changed.

5. Difference of Processing by Work Mode

Although the description has been made in a case where the work amount priority mode is selected, in a state where the fuel efficiency priority mode is selected, the pump combiner valve control section 114 computes the target flow rate of the hydraulic actuator (first hydraulic actuator) by the following method. The processing content other than the computation of the target flow rate is similar, also in a case where the work amount priority mode is selected, to a case where the fuel efficiency priority mode is selected.

Where the operation signal (first operation signal) is newly input in a state where the fuel efficiency priority mode is selected, the pump combiner valve control section 114 sorts the hydraulic actuators corresponding to the operation signals input at that time to the respective priority pumps according to the priority pump data. Then, the pump combiner valve control section 114 computes the total required flow rate of the assigned hydraulic actuators for each priority pump. In addition, for each priority pump, the flow rate reduction ratio is computed by dividing each deliverable flow rate by each total required flow rate.

Next, the flow rate reduction ratio computed for the hydraulic pump 40*a* is compared with the flow rate reduction ratio computed for the hydraulic pump 40*b*, and the flow rate reduction ratio with a smaller value is multiplied by the required flow rate of a newly operated hydraulic actuator (first hydraulic actuator) to compute the target flow rate of the hydraulic actuator.

By computing the target flow rate in this way, the target flow rate of any hydraulic actuator falls within the range of the deliverable flow rate of the corresponding priority pump, and no shortage occurs in the supply flow rate supplied from the priority pump. That is, each hydraulic actuator is driven at the supply flow rate supplied only from each priority pump. Therefore, although the supply flow rate of each hydraulic pump can be divided into a plurality of hydraulic actuators in the fuel efficiency priority mode, the supply flow rate to each hydraulic actuator is not combined, and the flow division of the supply flow line is suppressed more than that in the work amount priority mode, and thus the fuel efficiency is improved by reducing the flow dividing restriction loss.

6. Flowchart

Flowcharts related to the processing of the controller 100 described above are summarized in FIG. 8 and FIG. 9. Processing procedures of a pump combiner valve control function (first function) and a priority pump learning function (first function) by the controller 100 will be briefly summarized below. The processing of FIG. 8 and FIG. 9 is repeatedly executed while the controller 100 is energized. For example, the processing of FIG. 8 is repeatedly executed at a predetermined cycle time, and the processing of FIG. 9 is executed each time a new operation signal is input. In addition, the flowcharts of FIG. 8 and FIG. 9 depict processing related to one lever operation, and in a case where a plurality of hydraulic actuators is operated in parallel, the processing of FIG. 8 and FIG. 9 is executed in parallel for each operation.

6-1. Pump Combiner Valve Control Function (First Function)

FIG. 8 is a flowchart for depicting an operation control procedure of the pump combiner valves by the controller 100. When the controller 100 starts the processing of FIG. 8 and the first operation signal is input, as described above, the required flow rate computation section 101 computes a required speed on the basis of the first operation signal for the hydraulic actuator (first hydraulic actuator) related to the first operation signal (Step S801) and computes the required flow rate from the required speed (Step S802). In addition, the controller 100 allows the work mode sensing section 102 to sense the work mode (Step S803).

Thereafter, the controller 100 allows the pump combiner valve control section 114 to read the priority pump data from the priority pump storage section 113 (Step S804), obtains the flow rate reduction ratio by the above-described method, and computes the target flow rate from the required flow rate for the first hydraulic actuator (Step S805). Thereafter, the controller 100 allows the pump combiner valve control section 114 to determine whether the target flow rate of the first hydraulic actuator is equal to or less than the deliverable flow rate of the priority pump (Step S806), and if the target flow rate is equal to or less than the deliverable flow rate, to set the opening degree of the pump combiner valve corresponding to the non-priority pump to 0, so that the supply flow rate is not combined, and controls only the pump combiner valve corresponding to the priority pump according to the target flow rate (Steps S807 and S809). In addition, if the target flow rate of the first hydraulic actuator is larger than the deliverable flow rate of the priority pump, the controller 100 allows the pump combiner valve control section 114 to set the target flow rate to the insufficient flow rate for the pump combiner valve corresponding to the non-priority pump, so that the supply flow rate is combined, controls the pump combiner valve corresponding to the priority pump according to the target flow rate, and controls the pump combiner valve corresponding to the non-priority pump according to the insufficient flow rate (Steps S808 and S809).

The controller 100 repeatedly executes the above procedures at a predetermined cycle time.

6-2. Priority Pump Learning Function (Second Function)

FIG. 9 is a flowchart for depicting a learning procedure of the priority pump data by the controller. Although the example of FIG. 9 exemplifies a case in which learning of the priority pump data is sequentially executed during the operation of the hydraulic excavator, the processing to be described in FIG. 9 may be performed after the fact at a predetermined timing on the basis of the actual result data (the operation signals, the load pressure, and the state monitoring data on the pump delivery pressure and the like) accumulated during the operation. For example, the processing can be executed by delay processing when the power of the controller 100 is turned off, or the processing can be executed at a fixed time point in a day or every week.

When the controller 100 starts the processing of FIG. 9 and the first operation signal is input (Step S901), the priority pump learning section 115 starts sampling the actual result data for learning the priority pump data, that is, the operation signals of the operation devices 61 to 64, the load pressure of each hydraulic actuator, the pump delivery pressure of each hydraulic pump, and the like with respect to the input of the first operation signal (Step S902). Thereafter, when the input of the first operation signal started in Step S901 is stopped (Step S903), the controller 100 allows the priority pump learning section 115 to terminate the sampling of the actual result data for learning the priority pump data with respect to the input of the first operation signal (Step S904).

Thereafter, the controller 100 allows the priority pump learning section 115 to compute the actual computation value and the trial computation value of the flow dividing restriction loss for the period from the start of the input of the first operation signal to the stop as described above (Steps S905 and S906), and determines whether the actual computation value is better than the trial computation value (Step S907). If the actual computation value is better than the trial computation value, the controller 100 allows the priority pump learning section 115 to determine to maintain the setting of the priority pump data as it is for the operation load pattern corresponding to the first operation signal input in Step S901, outputs the determination result to the priority pump storage section 113, and updates the priority pump data (Steps S908 and S910). In this case, the priority pump data is not changed. In contrast, if the trial computation value is better than the actual computation value, the controller 100 allows the priority pump learning section 115 to determine to change the setting of the priority pump data for the operation load pattern corresponding to the first operation signal input in Step S901, outputs the determination result to the priority pump storage section 113, and updates the priority pump data (Steps S909 and S910). In this case, the priority pump data is changed for the corresponding operation load pattern.

The controller 100 repeatedly executes the above procedures each time the operations of the operation devices 61 to 64 are newly input.

7. Effect

As described above, in the present embodiment, the priority pump data for each operation is learned and made appropriate by the priority pump learning section 115 on the basis of the actual result data accumulated in conjunction with the operation of the hydraulic excavator, and the priority pump according to the operation is automatically selected on the basis of the priority pump data. Therefore, an appropriate priority pump can be decided every time for each hydraulic actuator in various situations without depending on the judgment by the operator. Since an appropriate priority pump is automatically selected according to not only the operation pattern of the operator but also the load pattern of the hydraulic actuator, it can contribute to balancing the fuel efficiency and the workability of the hydraulic excavator.

8. Modified Example

Although the example in which the directional control valves are provided on the downstream side (on the hydraulic actuator side) of the pump combiner valves has been described, the pump combiner valves may be provided on the downstream side of the directional control valves. For example, the hydraulic fluid supplied from the pump line of each hydraulic pump to the hydraulic actuators may be controlled by the directional control valves, and the hydraulic fluid supplied via the respective directional control valves may be combined via the pump combiner valves to be supplied to the hydraulic actuators.

In addition, although the example in which the flow dividing restriction loss is computed as the optimization index related to the learning of the priority pump data has been described, the workability (flow rate suppression time ratio) of the hydraulic excavator, the damage, life, and the like of the hydraulic equipment (for example, the hydraulic pump, the control valve, and the like) may be computed as the optimization indices instead of or in addition to the flow dividing restriction loss.

In addition, in the above-described embodiment, the hydraulic excavator having the bucket 23 attached to the tip end of the work device 20 (front work implement) as an attachment has been described as an example of the work machine, but the present invention can also be applied to a hydraulic excavator having attachments attached other than the bucket, or other kinds of work machines such as a wheel loader and a bulldozer as described above as long as the work machine uses hydraulic actuators that use a plurality of hydraulic pumps as hydraulic fluid sources.

In addition, although the configuration in which electric lever devices are used for the operation devices 61 to 64 has been described, the operation devices 61 to 64 may be pilot operation type operation lever devices if the operation amount is input to the controller 100 as an electric signal by the pressure sensor or the like as described above.

DESCRIPTION OF REFERENCE CHARACTERS

32: arm cylinder (hydraulic actuator)
33: bucket cylinder (hydraulic actuator)
34: swing motor (hydraulic actuator)
40*a*, 40*b*: hydraulic pump
31: boom cylinder (hydraulic actuator)
41 to 44: directional control valve
51*a*, 51*b*, 52*a*, 52*b*, 53*a*, 53*b*, 54*a*, 54*b*: pump combiner valve
61 to 64: operation device
71*a*, 71*b*, 72*a*, 72*b*, 73*a*, 73*b*, 74*a*, 74*b*: load pressure sensor
100: controller

The invention claimed is:

1. A work machine comprising: a plurality of hydraulic pumps; a first hydraulic actuator that uses the plurality of hydraulic pumps as hydraulic fluid sources; a directional control valve that controls a flow of hydraulic fluid to the first hydraulic actuator; a plurality of pump combiner valves that controls each supply flow rate of hydraulic fluid from the plurality of hydraulic pumps to the first hydraulic actuator; a first operation device that operates the directional control valve; a load pressure sensor that senses a load pressure of the first hydraulic actuator; a second hydraulic actuator that can share a hydraulic fluid source with the first hydraulic actuator; a second operation device that operates the second hydraulic actuator; and a controller that controls the plurality of pump combiner valves, wherein the controller stores priority pump data defining a priority pump that is selected from among the plurality of hydraulic pumps according to an operation of the first operation device and preferentially supplies hydraulic fluid to the first hydraulic actuator for each operation load pattern classified according to operation patterns of the first hydraulic actuator and the second hydraulic actuator and a load pattern of a hydraulic circuit of the first hydraulic actuator, the controller has a first function related to operation control of the plurality of pump combiner valves and a second function related to learning of the priority pump data, and, by the first function, the controller controls the plurality of pump combiner valves when the first operation device is operated, on a basis of the operation patterns corresponding to a first operation signal input in response to the operation of the first operation device and a second operation signal input in response to operation of the second operation device, the load pattern corresponding to the load pressure input from the load pressure sensor, and the priority pump data, by the second function, the controller accumulates actual result data on the first operation signal, the second operation signal, and the load pressure, is configured to compute an actual computation value of a preset predetermined optimization index for the operation of the first operation device on a basis of the actual result data under an implementation condition in which hydraulic fluid is preferentially supplied to the first hydraulic actuator from the priority pump, is configured to compute a trial computation value of the optimization index for the operation of the first operation device on the basis of the actual result data under a virtual condition in which hydraulic fluid is preferentially supplied to the first hydraulic actuator from a non-priority pump that is one of the hydraulic pumps excluding the priority pump, and is configured to compare the actual computation value and the trial computation value with each other, and update the priority pump data by reflecting the virtual condition in a case where the trial computation value is better than the actual computation value.

2. The work machine according to claim 1, wherein the operation pattern is classified according to the second hydraulic actuator that is operating at time when the first operation signal is input and a required flow rate of the first hydraulic actuator.

3. The work machine according to claim 2, wherein the load pattern is classified according to each pump delivery pressure of the plurality of hydraulic pumps in addition to the load pressure of the first hydraulic actuator.

4. The work machine according to claim 1, wherein the optimization index is a flow dividing restriction loss caused by dividing and supplying hydraulic fluid from a same hydraulic pump to the first hydraulic actuator and the second hydraulic actuator.

5. The work machine according to claim 1, wherein a plurality of the second hydraulic actuators is provided.

6. The work machine according to claim 1, wherein the controller is provided with a work amount priority mode for compensating a shortage of a suppliable flow rate with respect to a required flow rate with a supply flow rate of the non-priority pump when the required flow rate according to the first operation device exceeds the suppliable flow rate from the priority pump, and a fuel efficiency priority mode for limiting the required flow rate by the suppliable flow rate when the required flow rate according to the first operation device exceeds the suppliable flow rate from the priority pump, and stores therein the priority pump data for each of the work amount priority mode and the fuel efficiency priority mode.

* * * * *